(12) United States Patent
Adams et al.

(10) Patent No.: US 11,126,994 B2
(45) Date of Patent: Sep. 21, 2021

(54) SYSTEMS AND METHODS FOR CONTACT CARD CUSTOMIZATION

(71) Applicant: Microsoft Technology Licensing, LLC, Redmond, WA (US)

(72) Inventors: Ross P. Adams, Redmond, WA (US); Terence M. Zink, Bellevue, WA (US); Jon Meling, Troms (NO); Amund Kronen Johansen, Troms (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/631,036

(22) Filed: Jun. 23, 2017

(65) Prior Publication Data

US 2018/0374078 A1    Dec. 27, 2018

(51) Int. Cl.
*G06Q 20/34*    (2012.01)
*G07F 7/10*    (2006.01)
(Continued)

(52) U.S. Cl.
CPC .......... *G06Q 20/341* (2013.01); *G06F 21/77* (2013.01); *G06Q 10/10* (2013.01); *G06Q 10/107* (2013.01);
(Continued)

(58) Field of Classification Search
CPC .... G06Q 20/341; G06Q 10/10; G06Q 10/107; G06Q 20/3223; G06Q 20/3415;
(Continued)

(56) References Cited

U.S. PATENT DOCUMENTS 6,442,263 B1 *  8/2002  Beaton ............ H04M 1/274516
                                                        379/142.04
7,003,546 B1 *  2/2006  Cheah .................... G06Q 10/10
                                                        709/200
(Continued)

FOREIGN PATENT DOCUMENTS

WO        2007005606 A2        1/2007
WO        2007049832 A1        5/2007
WO    WO-2007049832 A1 *       5/2007     ........... G06Q 10/107

OTHER PUBLICATIONS

Kulka, Rene, "BIMI (Brand indicators for message identification)—will soon receive newsletter favicons?", https://translate.google.com/translate?hl=en&sl=auto&tl=en&u=https%3A%2F%2Fwww.optivo.com%2Fde%2Fblog%2F2017%2Fbimi-brand-indicators-for-message-identification-kommen-bald-newsletter-favicons, Published on: Apr. 19, 2017, 5 pages.

(Continued)

*Primary Examiner* — Trong H Nguyen
*Assistant Examiner* — Moeen Khan
(74) *Attorney, Agent, or Firm* — Shook, Hardy & Bacon L.L.P.

(57) ABSTRACT

Systems and methods for contact card customization. More specifically, the systems and methods herein leverage authentication protocols and the branded indicators for message identification (BIMI) protocol to allow organizations to display customized contact card information in their sent messages. As such, the systems and methods provide customizable, dynamic, and secure contact cards that can distinguish between an individual and an organization unlike previously utilized contact card systems and methods.

16 Claims, 12 Drawing Sheets

(51) Int. Cl.
*G06F 21/77* (2013.01)
*G06Q 20/36* (2012.01)
*H04L 29/08* (2006.01)
*G06Q 10/10* (2012.01)
*G06Q 20/32* (2012.01)
*G06F 21/00* (2013.01)
*H04L 9/00* (2006.01)

(52) U.S. Cl.
CPC ....... *G06Q 20/3223* (2013.01); *G06Q 20/346* (2013.01); *G06Q 20/3415* (2013.01); *G06Q 20/355* (2013.01); *G06Q 20/3574* (2013.01); *G06Q 20/363* (2013.01); *G06Q 20/3672* (2013.01); *G07F 7/10* (2013.01); *H04L 67/306* (2013.01); *G06F 21/00* (2013.01); *H04L 9/00* (2013.01); *H04L 67/1095* (2013.01)

(58) Field of Classification Search
CPC ............... G06Q 20/346; G06Q 20/355; G06Q 20/3574; G06Q 20/363; G06Q 20/3672; G06F 21/77; G06F 21/00; G07F 7/10; H04L 67/306; H04L 9/00; H04L 67/1095
USPC ........................................................ 713/173
See application file for complete search history.

(56) References Cited

U.S. PATENT DOCUMENTS

| | | | |
|---|---|---|---|
| 7,413,085 B2 | 8/2008 | Zager et al. | |
| 8,738,719 B2 | 5/2014 | Lee et al. | |
| 8,789,753 B1* | 7/2014 | de Jong | H04L 63/0853 235/382 |
| 9,378,290 B2* | 6/2016 | Scott | G06F 17/24 |
| 9,817,786 B1* | 11/2017 | Khan | G06F 13/4221 |
| 2002/0019849 A1 | 2/2002 | Tuvey et al. | |
| 2004/0153649 A1* | 8/2004 | Rhoads | G06F 17/241 713/176 |
| 2005/0039019 A1* | 2/2005 | Delany | H04L 9/3263 713/176 |
| 2006/0065708 A1 | 3/2006 | Kanatani et al. | |
| 2006/0167699 A1* | 7/2006 | Rontynen | G06Q 10/10 705/26.1 |
| 2006/0200523 A1* | 9/2006 | Tokuda | G06Q 10/107 709/206 |
| 2006/0293905 A1* | 12/2006 | Ramanathan | G06Q 10/10 709/206 |
| 2007/0005713 A1* | 1/2007 | LeVasseur | H04L 63/126 709/206 |
| 2007/0119918 A1* | 5/2007 | Hogg | G06Q 20/04 235/380 |
| 2007/0250550 A1* | 10/2007 | Berninger | G06Q 10/10 |
| 2008/0046823 A1* | 2/2008 | Korbin | G06Q 40/02 715/733 |
| 2009/0013197 A1 | 1/2009 | Seshadri et al. | |
| 2011/0035284 A1 | 2/2011 | Moshfeghi | |
| 2013/0046973 A1* | 2/2013 | Resch | H04L 9/085 713/156 |
| 2014/0164478 A1 | 6/2014 | Kleppmann et al. | |
| 2014/0358777 A1* | 12/2014 | Gueh | G06Q 20/3223 705/43 |
| 2015/0089417 A1* | 3/2015 | Dayan | G06F 16/9558 715/765 |
| 2015/0365283 A1* | 12/2015 | Ronca | H04L 41/0816 705/71 |
| 2015/0365369 A1 | 12/2015 | Tokuda et al. | |
| 2016/0098566 A1* | 4/2016 | Patil | G06F 21/60 726/26 |
| 2016/0112319 A1* | 4/2016 | Hasani | H04L 45/748 370/392 |

OTHER PUBLICATIONS

Vierke, Florian, "What's new? Insights from the CSA Summit in Cologne", https://translate.google.com/translate?hl=en&sl=de&tl=en&u=https%3A%2F%2Fmapp.com%2Fde%2Fblog%2Finsights-vom-csa-summit-in-koeln%2F&sandbox=1, Published on: May 19, 2017, 4 pages.

Loder, et al., "Brand Indicators for Message Identification (BIMI)", https://authindicators.github.io/rfc-brand-indicators-for-message-identification/, Published on: Apr. 16, 2017, 21 pages.

"International Search Report and Written Opinion Issued in PCT Application No. PCT/US2018/034013", dated Nov. 2, 2018, 11 Pages.

* cited by examiner

SYSTEMS AND METHODS FOR CONTACT CARD CUSTOMIZATION

BACKGROUND

As messaging has become more popular, messaging applications have expanded to provide supplemental content in additional to messages to users. For example, client computing devices and/or messaging applications are capable of displaying additional information regarding the sender and the recipient of a message. For example, general contact information may be provided when a user hovers over or selects the sender or receiver a message.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for contact card customization. More specifically, the systems and methods disclosed herein leverage authentication protocols and branded indicators for message identification (BIMI) protocols to allow organizations to display customized contact card information in their sent messages. As such, the systems and methods as disclosed herein provide customizable, dynamic, and secure contact cards that can distinguish between an individual and an organization unlike previous contact card systems and methods.

One aspect of the disclosure is directed to a system for displaying a contact card for a sender. The system includes at least one processor and a memory. The memory encodes computer executable instructions that, when executed by the at least one processor, are operative to:
  receive a message from the sender;
  search for basic contact card information from the sender;
  collect the basic contact card information for the sender;
  receive authentication for the sender;
  receive authentication metadata with the authentication for the sender;
  generate a key based on the authentication metadata;
  collect extended contact card data for the sender from a profile store based on the key;
  apply a card framework to the basic contact card information and the extended contact card data to select relevant content;
  generate a contact card based on the relevant content; and
  display the contact card.

In another aspect, the disclosure is directed to a method for displaying a contact card for a sender. The method includes:
  receiving a message from the sender;
  receiving authentication metadata with an authentication of the sender;
  generating a contact key based on the authentication metadata;
  retrieving extended contact card data based on the contact key;
  generating a contact card based on the extended contact card data; and
  displaying the contact card.

In yet another aspect of the invention, the disclosure is directed to a system for contact card customization. The system includes at least one processor and a memory. The memory encodes computer executable instructions that, when executed by the at least one processor, are operative to:
  receive sets of contact card information from different organizations associated with different domain names, wherein each set of contact card information is associated with a selector;
  create a retrieval key for each set of the contact card information based on the associated domain name to form a group of retrieval keys;
  receive from a first email recipient a first collection request, wherein the first collection request includes a first authentication metadata generated key;
  match the first authentication metadata generated key to a first retrieval key in the group of retrieval keys; and
  provide to the first email recipient a first set of contact information associated with the first retrieval key that matches the first authentication metadata generated key.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
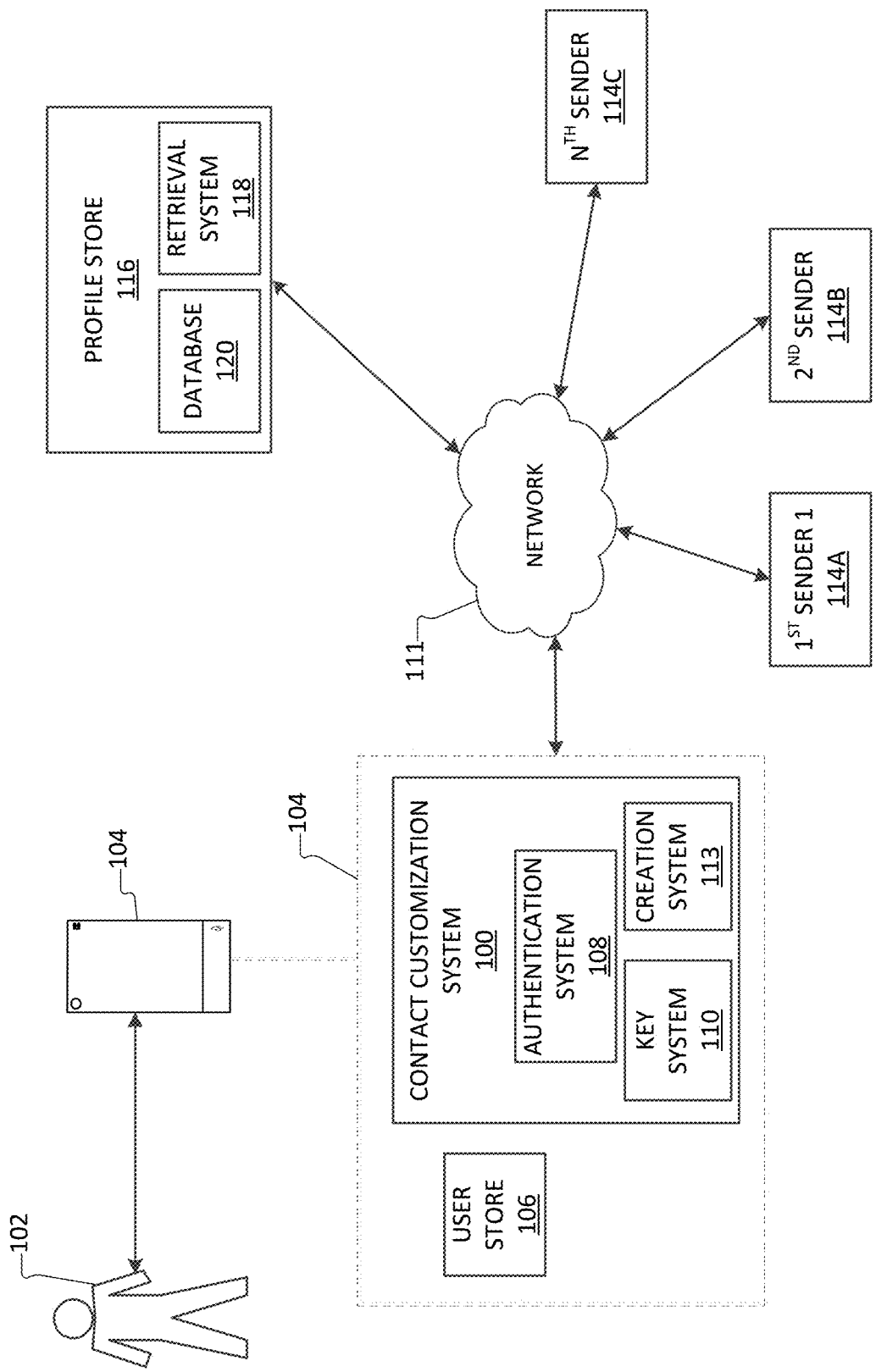
FIG. 1A is a schematic diagram illustrating a contact card system and a profile store being utilized by a user via a client computing device, in accordance with aspects of the disclosure.

In the following detailed description, references are made to the accompanying drawings that form a part hereof, and in which are shown by way of illustrations, specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

As messaging has become more popular, messaging applications have expanded to provide supplemental content in additional to messages to users. For example, client computing devices and/or messaging applications are capable of displaying additional information regarding the sender and the recipient of a message. For example, contact information may be provided when a user hovers over or selects the sender or receiver a message. However, the contact information may be minimal and may be provided as a static set of information.

Typically, a client computing device searches the user's store to identify contact information for the sender and/or recipient of the message. However, in many cases, the sender of the email is not a person, but is instead an alias for a company or organization. In these instances, there is very little information about the sender available on the user's store.

Some systems and methods have attempted to rectify this lack of information about a sender by extracting an organization name form the domain name of the sender address and searching for information in a general knowledge database based on the extracted domain name or the sender address. However, in these systems it is not possible to separate an individual sending an email from a company address, and an email being sent from the company itself. Additionally, these previously utilized systems do not enable a sender organization to control the data pulled and presented about the organization beyond a static profile. Further, these previously utilized systems and method may be easily taken advantage of by imposters trying to impersonate an organization in order to con or steal from a message recipient.

The systems and methods as disclosed herein are directed displaying customized contact cards and/or to allowing an organization to provide customized contact cards. The customized contact cards cannot be utilized or accessed by scammers trying to impersonate an organization. The systems and methods for providing customized contact cards leverages current message verification standards and branded indicators for message identification (BIMI) standards for verified branding. The ability of the systems and methods described herein to provide customizable and secure contact cards allows organizations to create targeted and/or specialized displays of information that may vary based on sender, season, and/or time of year unlike previously utilized systems and methods that searched for static information based on extracted domain names or sender addresses.

Figure 1B:
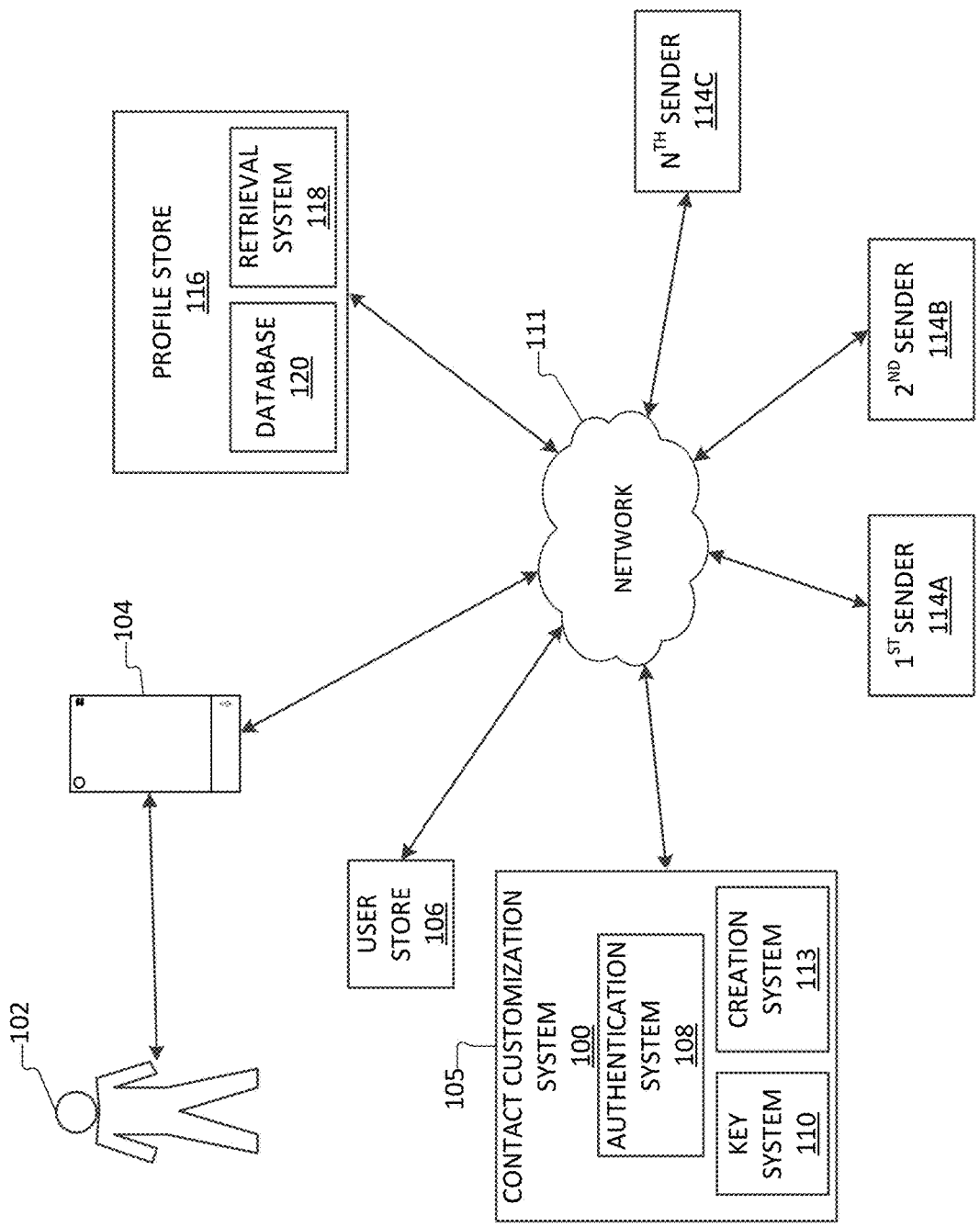
FIG. 1B is a schematic diagram illustrating a contact card system and a profile store being utilized by a user via a client computing device, in accordance with aspects of the disclosure.

FIGS. 1A-1B illustrate different examples of a contact customization system 100 being utilized by a user 102 via a client computing device 104, in accordance with aspects of the disclosure. The contact customization system 100 allows a sender of a message to control and customize a contact card for the sender that is displayed to recipient user 102 in the received message. The contact customization system 100 leverages current message verification standards and BIMI standards. The contact customization system 100 retrieves the customized contacts from a profile store 116. The profile store 116 communicates via a network 113 with a first sender 114A, a second sender 114B and/or N$^{th}$ senders 114C to create and store customized contact information that may be provided to a recipient of an email from the organizations or senders 114A-C.

The contact customization system 100 may include an authentication system 108, a key system 110, and/or a creation system 112, as illustrated in FIGS. 1A-1B. In some aspects, contact customization system 100 includes the profile store 116. In other aspects, the contact customization system 100 communicates via a network 111 with the profile store 116 that is separate and distinct form the contact customization system 100. In some aspects, contact customization system 100 includes a user store 106 (also referred to herein as recipient store 106). In other aspects, the contact customization system 100 communicates with the user store 106 on the same client computing device 104 or on a different client computing device 104 (not shown), or on a server computing device 105 (FIG. 1B) that is separate and distinct form the contact customization system 100. The contact customization system 100, the profile store 116 and/or the organization or message senders 114A-C (referred to interchangeably as "sender 114") may communicate via a network 111 or other communication system between each other.

In some aspects, the contact customization system 100 is implemented on the client computing device 104, as illustrated by FIG. 1A. In a basic configuration, the client computing device 104 is a computer having both input elements and output elements. The client computing device 104 may be any suitable computing device for implementing the contact customization system 100. For example, the client computing device 104 may be a mobile telephone, a smart phone, a tablet, a phablet, a smart watch, a wearable computer, a personal computer, a gaming system, a desktop computer, a laptop computer, a holographic device, a virtual reality system, and/or etc. This list is exemplary only and should not be considered as limiting. Any suitable client computing device 104 for implementing the contact customization system 100 may be utilized.

In other aspects, the contact customization system 100 is implemented on a server computing device 105, as illustrated in FIG. 1B. The server computing device 105 may provide data to and/or receive data from the client computing device 104 through a network 111. In some aspects, the network 111 is a distributed computing network, such as the Internet. In further aspects, the contact customization system 100 is implemented on more than one server computing device 105, such as a plurality or network of server computing devices 105 (not shown). For example, the authentication system 108 may be located on the same server computing device 105 as the key system 110, as illustrated in FIGS. 1A-1B, or may be located on separate server computing devices 105. In some aspects, the contact customization system 100 is a hybrid system with portions of the contact customization system 100 on the client computing device 104 and with portions of the contact customization system 100 on one or more server computing devices 105.

In response to receiving a message from a sender, the authentication system 108 of the customization system 100 verifies the domain name of the sender. The domain name of the sender cannot currently be verified unless the sender 114 of the email utilizes current standards for message authentication. If the sender 114 does not utilize the current standards for message authentication it is not currently possible for the authentication system 108 to retrieve the verified domain name associated with the sender 114 of a received message. The domain is verified when the authentication system 108 can determine that the message sender is authorized to use the domain name and that the message originated from a known organization associated with the domain name. The authentication system 108 may utilize any known and desirable authentication mechanism, such as Domain-based Message Authentication, Reporting, and Conformance (DMARC).

If the message can be authenticated by the authentication system 108, the authentication system 108 queries the domain name system (DNS) for the BIMI record that corresponds to the verified domain name. In some aspects, for the contact card customization system 100 to work, the organization or sender must also utilize the BIMI protocol. If a BIMI record is present for the verified domain name, the authentication system 108 collects authentication metadata for the received message. The term "collect(s)" or "collecting" as utilized herein refers to the active retrieval of information and/or the passive receiving of information. In some aspects, the authentication metadata includes a BIMI location. In further aspects, the sender may stamp the sent message with a BIMI selector. The BIMI location is utilized to find the location to retrieve the desired brand indicator for the organization that sent the message. The BIMI selector indicates which brand indicator at the provided location should be selected. For example, the BIMI location may be an IP address such as, "l=https://image.example.com/32x32.png" and the BIMI selector may be a label utilized to identify the correct brand indicator at the address, such as "s=spring." Accordingly, the authentication system 108 utilizes this information to provide and display a specific label from the sender organization 114 in the sent message. As such, the current message verification standards and BIMI standards are implemented in accordance with their traditional functionality.

However, the contact customization system 100 utilizes these normal standards to allow companies to provide and display customized contact information for their organizations in their sent messages.

The key system 110 of the contact customization system 100 collects the authentication metadata and/or the BIMI selector. The authentication metadata include the verified domain name. In some aspects, the authentication metadata also includes the BIMI selector. In other aspects, the BIMI selector is stamped to a sent message by the sender. In these aspects, key system 110 collects the BIMI selector from the stamp on the received message. The key system 110 may also collect the sender address. The key system 110 constructs a contact key based on the authentication metadata. In some aspects, the key system 110 constructs the contact key based additionally on the BIMI selector and/or the sender address. The contact key may also be referred to as the "authentication metadata generated key" herein. If no authentication metadata is collected, the key system 110 does not create a contact key. A set of predetermined rules or a specific encoding algorithm may be utilized by the key system 110 to form the contact key based on the authentication metadata, selector, and/or sender address.

The creation system 113 of the contact customization system 113 collects information based on the sender and/or recipient of a message and creates a contact for the sender or recipient based on the collected information. In some aspects, when a message is received by the user 102 or recipient 102, the creation system 113 may search the user's store 106 for information about the sender 114. In some aspects, when the sender 114 is an individual, the user 102 may have a stored basic contact card that lists the name, address, phone number, email address, and other details relating to the sender 114 in a user store 106. The creation system 113 may utilize any collected information, such as the basic contact card, from the user store 106 to generate a contact card for the sender 114. The user store 106 also includes any information stored on or in association with one or more client computing devices 104 of the user 102. The information collected from the user store 106 that relates to a sender may be referred to herein as "basic contact card data." In some aspects, if the creation system 113 collects any information relating the sender from the user store 106, the creation system 113 creates the contact card based on the information collected from the user store 106. In further aspects, if the creation system 113 collects enough information relating the sender from the user store 106 to meet a predetermine collection threshold, the creation system 113 creates the contact card based on the information collected from the user store 106. In some aspects, if any information is collected about the sender or enough information is collected to meet a predetermined collection threshold from the user store 106, then the creation system 113 assumes that the sender is an individual. In additional aspects, if the creation system 113 makes an assumption that the sender is an individual, the creation system 113 may structure the created contacted based on this assumption.

In other aspects, if the creation system 113 does not collect enough any information relating the sender from the user store 106 to meet a predetermine collection threshold, the creation system 113 searches for additional information from a profile store 116 if a contact key was created by the key system 110. In other aspects, if the creation system 113 does not collect enough information relating the sender from the user store 106 to meet a predetermine collection threshold, the creation system 113 searches for additional information from a profile store 116 if a contact key was created by the key system 110. In some aspects, if no information is collected about the sender or if not enough information is collected about the sender from the user store 106, the creation system 113 may assume that the sender is not an individual and is an organization instead. In these aspects, the creation system 113 may create a contact card or structure the contact card during creation in a specific manner based on the assumption that the sender is an organization. In further aspects, creation of a contact key by the key system 110 automatically triggers a search for additional information from the profile store 116 by the creation system 113. The creation system 113 queries a profile store 116 utilizing the contact key. If the contact key matches a retrieval key in the profile store 116, the creation system 113 collects a set of contact information (also referred to herein as "extended contact card data") from profile store that is associated with the contact key. In other words, the creation system locates an appropriate profile within the profile store based on the contact key and then collects the appropriate information from within the appropriate profile based on the contact key. In some aspects, the profile is located based on a verified domain. In other aspects, the appropriate information within the profile is located and collected based on the selector and/or sender address.

Each retrieval key will require a specific list of requirements before the contact card information associated with that retrieval key can be accessed. The contact key matches or meets the requirements of the retrieval key when the contact key includes all of the requirements listed in the retrieval key. In some aspects, the contact key matches the retrieval key, even though, the contact key includes additional information to the requirements of the retrieval key.

As such, the information in the contact key does not have to be identical to the retrieval key but needs to include all of the listed requirements to match the retrieval key.

The requirements of the retrieval key include at least a verified domain name. In some aspects, the requirements of the retrieval key may also include a sender address and/or a selector. The requirements of the retrieval key are set by the sender. For example, the sender may provide a list of sender addresses to the profile store 116 that may access a given set of stored contact card information.

The set of contact information from the profile store may include any information the sender desires to display in the contact card. For example, the set of contact information may include sender name, address, website, promotion information, telephone number, fax number, or extensibility points. Extensibility points include data that can be found on the user store 106, such as package tracking information, flight information, other correspondence, and etc. that may be located on the user store 106. This list is exemplary only and is not meant to be limiting. In some aspects, the creation system 113 generates a contact card based on the set of contact information collected from the profile store and/or any collected information for the user store 106.

In alternative aspects, the creation system 113 applies a card framework to any collected information, such as the information from the profile store 116 and/or information for the user store 106 to select relevant content for generating the contact card. In some aspects, the card framework is a set of predetermine rules. The set of predetermined rules may be set by the creator of the messaging application and/or the by a user (either a recipient or a sender) of the messaging application. In other aspects, the card framework includes a relevancy threshold. The relevancy threshold may be set by the creator of the messaging application and/or the by the user of the messaging application.

The creation system 113 may create a contact card with multiple windows or tabs to divide out different sets of collected information about the sender. For example, the creation system 113 may provide a tab for the organization and different tab for recently accessed files in the created contact card.

The profile store 116 is a platform where organizations or message senders can provide customized contact information for their sent messages. The profile store 116 includes a database 120 and a retrieval system 118. The profile store 116 receives one or more sets of contact information from one or more senders or organizations. Each sender or organization is associated with one or more verified domain names. In some aspects, a profile may be created in the profile store 116 based on the verified domain name for the sender. In some aspects, a set of contact information is also associated with a selector (also referred to herein as a header) that is assigned by the organization. In further aspects, a set of contact information may also be associated with one or more sender addresses, which are also assigned by the organization. The retrieval system 118 creates a retrieval key for each set of contact information based at least on the verified domain. In some aspects, each set of contact information is placed or stored in a profile with the verified domain name that matches the verified domain name of its retrieval key. In some aspects, the retrieval system 118 creates a retrieval key for each set of contact information based on the verified domain and the selector and/or one or more sender addresses. In some aspects, the retrieval system 118 utilizes a set of predetermined rules and/or an encoding algorithm to create the retrieval key based on the verified domain name, selector, and/or sender address. If utilized, the set of predetermined rules are and/or the encoding algorithm is the same as or similar to the set of predetermined rules and/or encoding algorithm utilized by the message recipient to create a contact key. Each set of customized contact information may be stored in database 120 of the profile store 116. The retrieval system 118 utilizes the retrieval key as an index or identifier for locating and/or collecting a specific set of contact information in the database 120.

As such, a sender or organization associated with a verified domain name may create several different customized contact card information sets for the same domain. In some aspects, the profile system 116 creates a profile for each different verified domain name. Any retrieval key with the same verified domain name is saved under the corresponding profile. Accordingly, different sets of customized contact card data for the same verified domain name are saved in the database 120 under the same profile. Each different set of customized contact card information can be selected from the profile based on sender address and/or a selector in the retrieval key.

For example, a first sender (e.g., first sender 114A) having one verified domain name may send four different sets of contact information. The first set may be associated with the selector "Christmas", the second set may associated with the selector "Halloween", the third set may be associated with the sender address "noreply", and the fourth set may be associated with sender address "billing". Accordingly, the sender may provide promotional information to customers during Christmas and Halloween and may provide different information to external messages sent by the noreply email address and for the internal emails sent to employees of the billing department. Once the first sender 114A has stored and saved the four different sets of contact information, the first sender merely has to register BIMI selectors "Christmas" and "Halloween" and stamp sent mail with a selector as desired to utilize a particular stored customized contact information on the profile store associated with those selectors. A verified domain name is all that is necessary for utilizing the remaining two sets of customized contact cards for this sender.

In some aspects, the sender or organization may retrieve a stored set of contact card information from the profile store 116 and edit, replace, and/or delete the set of contact card information from the profile store 116. The sender may retrieve a stored set of contact information utilizing an appropriate retrieval key. In some aspects, the profile store 116 provides each retrieval key created for a sender to the sender. In other aspects, the sender retrieves one or more created retrieval keys for different sets of contact card information from the profile store 116.

The profile system 116 receives a collection request from an email recipient. The collection request includes an authentication metadata generated key. If the retrieval system 118 matches the authentication metadata generated key to a retrieval key, the set of contact information associated with that retrieval key is collected and provided to the email recipient. If the retrieval system 118 does not match the authentication metadata generated key to a retrieval key, no data or an error code is provided to the message recipient.

The contact card generated by the creation system 113 may be displayed in the message received by the user 102. In some aspects, the contact card is automatically displayed upon generation. In other aspects, the contact card is display upon the occurrence of a condition, such as the receipt of cursor hover input that the cursor of the user is hovering over the sender's or recipient's name or the receipt of selection input when the sender's or recipient's name is selected by the user. This list is exemplary only and is not meant to be limiting. The contact card may be displayed upon the occurrence of any desired condition.

Figure 2A:
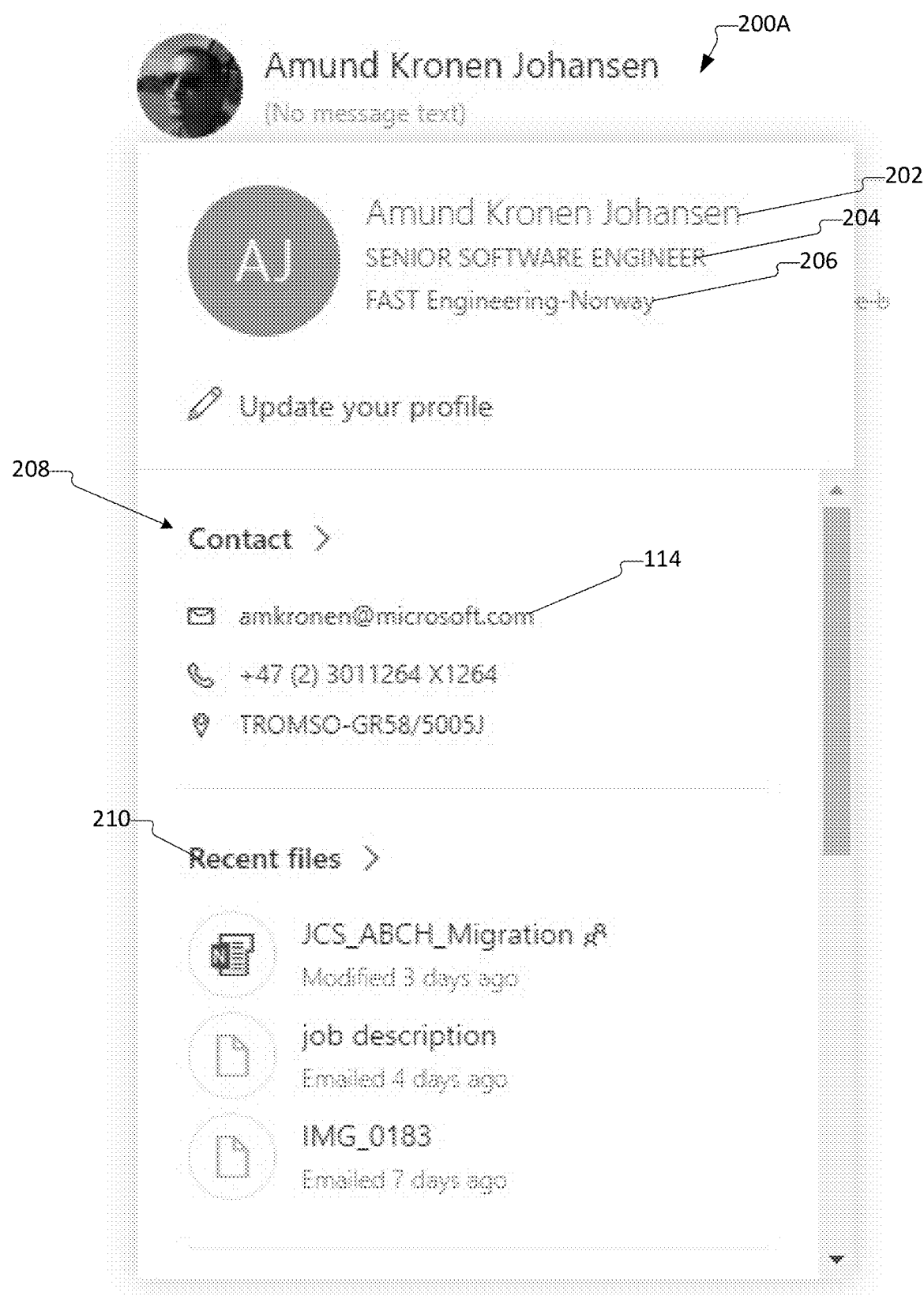
FIG. 2A is a screen shot of a window illustrating a contact card, in accordance with aspects of the disclosure.
Figure 2B:
FIG. 2B is a screen shot of a window illustrating a contact card, in accordance with aspects of the disclosure.
Figure 2C:
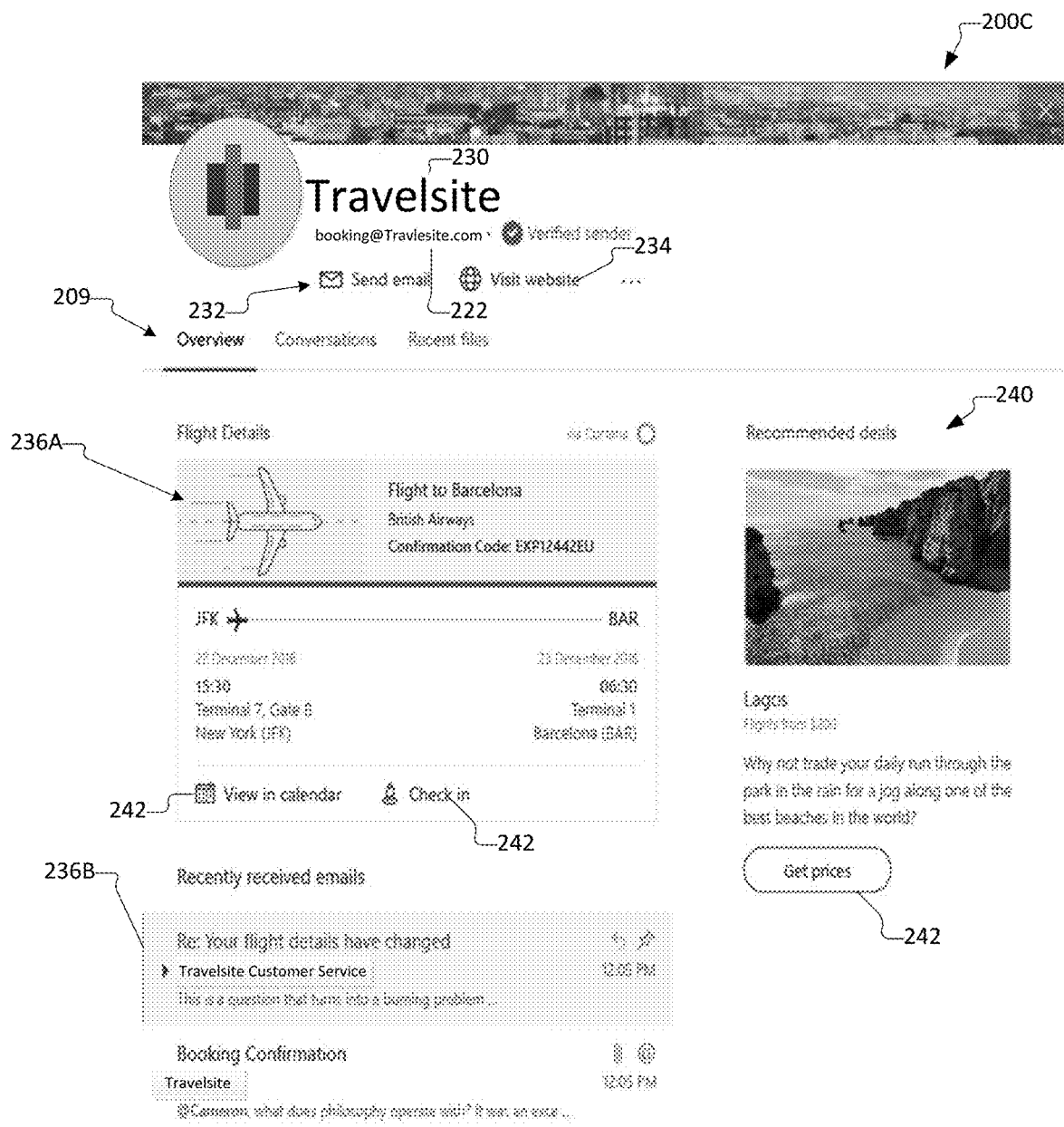
FIG. 2C a screen shot of a window illustrating a contact card, in accordance with aspects of the disclosure.

FIGS. 2A-2C are screen shots of a window illustrating different contact cards 200 for a sender 114 (e.g., a sender named Amund Kronen Johansen) of a message. FIG. 2A is a screen shot of window illustrating an example of contact card 200A generated based on information retrieved from a user store 106. In this example, the contact customization system 100 searched the user store 106 for information relating to the sender address, the customization system 100 identified a stored contact that contained the sender address. The customization system 100 additionally searched for and found previous emails and documents shared/sent between the user and the sender address in the user store 106. All of this information was collected by the contact customization system 100 and utilized to create and display the contact card 200A illustrated in FIG. 2A. The contact card 200A includes the name 202, position 204, company 206, and some contact information 208 of the sender 114. Additionally, contact card 200A includes some recent files 210 or documents shared between the user 102 and sender 114.

FIG. 2B is a screen shot of window illustrating an example of a contact card 200B for a sender 114 (e.g., a sender named Amund Kronen Johansen) generated based on information retrieved from a user store 106 and information retrieved from a profile store 116. FIG. 2B is a contact card for the same sender 114 as provided in FIG. 2A. As such, most of the same information retrieved from the user store 106 by the contact customization system 100 from FIG. 2A is also displayed in FIG. 2B, such as name 202, position 204, company 206, and some contact information 208. However, this contact card 200B also includes a list of tabs 209 where different data for the contact card 200B can be displayed based on the selected tab. The contact tab 209 is currently selected. As such, the contact information for the sender 114 is displayed. The other tabs 209 include "About", "Organization", and "Recent Files." The recent files tab 209, if selected, would show the same files 210 as displayed in FIG. 2A. The "about" tab may display addition profile information about a sender that is identified as an individual, such as skills, interests, hobbies, birthday, and other text about the sender This additional information may be gathered from an accessible sharepoint or other profile for the sender.

One of the tabs 209 is an organization tab 212. If organization tab 212 is selected, information collected from the profile store 116 for the company FAST Engineering-Norway is displayed. As such, the created contact 200B displays information gathered from the user store 106 and from the profile store 116. In these aspects, the contact customization system 100 may have been programmed to create a contact card based on all gathered data or may have only selected data that met a predetermined set of rules or a relevancy threshold.

FIG. 2C is a screen shot of window illustrating an example of contact card 200C for a sender 114 generated based on information retrieved from a profile share 116. As illustrated in FIG. 2C, the sender address 222 (booking@travelsite.com) is an alias for the organization, "Travelsite," and is not an individual. In some aspects, in this example, the contact customization system 100 may not have been able to pull any information regarding the verified domain or sender address from the user store 106 and therefore did not provide any basic contact card information. Alternatively, the personal card information pulled from the user store 106 may not have met a set of predetermined rules or met a relevancy threshold and therefore was not displayed. As such, contact customization system 100, in this example, created a contact key based at least on verified domain, searched a profile store 116 based on the contact key, collected a set of customized contact information from the profile store 116, and utilized the collected information to create and display the contact card 200C.

As illustrated by FIG. 2C, the set of customized information from the profile store 116 included the company name 230, email contact 232, website 234, extensibility hooks to locate upcoming flights 236A in the user store 106 and recent correspondence between the user and the company 236B, a current promotion 240, and useful links 242 (e.g., "view in calendar" and "check in"). All of this information was provided and stored in the profile store by "Travelsite" based on the sender address 222 of booking@travelsite.com. Additionally, the set of customized information from the profile store 116 included additional information listed under tabs 209 of "Conversations" and "Recent files", which are not displayed.

Figure 3:
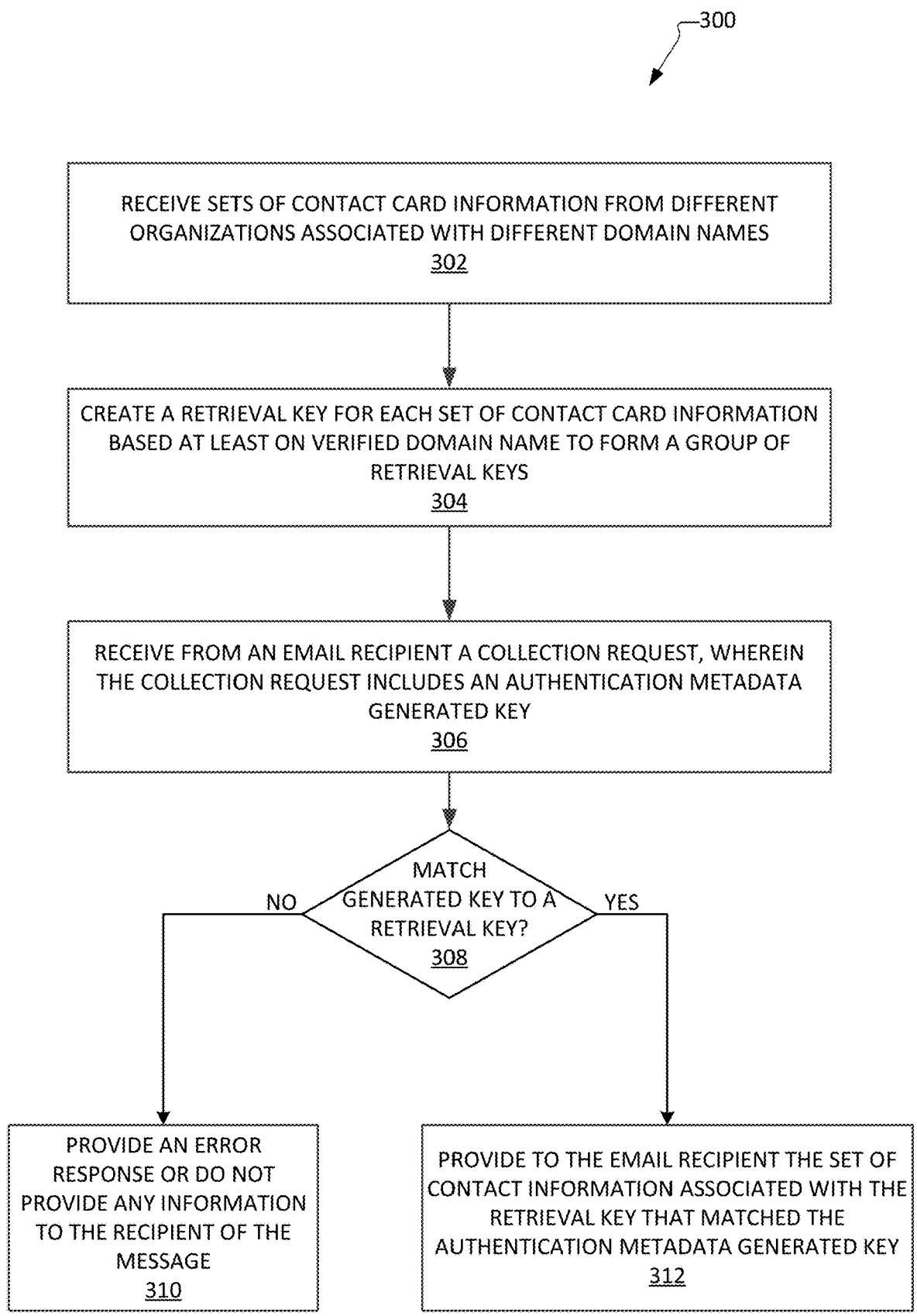
FIG. 3 is block flow diagram illustrating a method for contact card customization, in accordance with aspects of the disclosure.

FIG. 3 illustrates a flow diagram conceptually illustrating an example of a method 300 for customizing a contact card. In some aspects, method 300 is implemented by the profile store 116 described above. Method 300 allows one or more organizations to provide customized contact cards that are displayed in an email from the organization to the recipient.

Method 300 includes operation 302. At operation 302, one or more sets of contact card information from one or more organizations (or senders of messages) associated with different domain names is received. In aspects, each sender or organization has a verified domain name in order to implement method 300. For example, several different organizations or senders could store different sets of contact card information.

Next, at operation 304, a retrieval key is created for each set of contact card information based at least on the associated domain name to form a group of retrieval keys. In further aspects, the retrieval key is also based on a selector and/or a sender address. The verified domain name, selector, and/or sender addresses are requirements that must be met by a contact key in order access the set of contact card information associated with the retrieval key. As such, one organization can store several different sets of customized contact card information for the same verified domain name and each set of customized contact card information may correspond to a retrieval key. For example, the verified domain for the organization of "Travelsite" could have a set of customized contact card information for the sender address "booking@travelsite.com", a different set of customized contact card information for the selector "Hawaii", and a different set of customized contact card information for a list of different sender addresses. In this example, all of this information is associated with the same profile or verified domain of Travelsite. In some aspects at operation 304, the retrieval key may be created based on a set of rules or utilizing an encoding algorithm. If a set of rules or an encoding algorithm is utilized, the rules are or the algorithm is the same or similar to the set of rules or the encoding algorithm utilized by the message recipient to create a contact key. The retrieval key formed at operation 304 is utilized as an indicator to locate and collect an associated set of contact card information.

At operation 306, a collection request is collected from an email recipient. The collection request includes an authentication metadata generated key (also referred to herein as a contact key). At operation 306, several collection requests from several different email recipients or the same email recipient may be received and handled simultaneously, concurrently, and/or sequentially.

Next, at operation 308, a determination is made whether the authentication metadata generated key matches any retrieval key in the group of stored retrieval keys. The authentication metadata generated key matches or meets the requirements of the retrieval key when the authentication metadata generated key includes all of the requirements listed in the retrieval key. In some aspects, the authentication metadata generated key matches the retrieval key, even though, the authentication metadata generated key includes additional information to the requirements of the retrieval key. As such, the information in the authentication metadata generated key does not have to be identical to the retrieval key but needs to include all of the listed requirements to match the retrieval key. If a determination is made at operation 306 that the authentication metadata generated key matches a retrieval key, then operation 312 is performed. If a determination is made at operation 306 that the authentication metadata generated key does not match any retrieval key in the group of stored retrieval keys, then operation 310 is performed.

At operation 310, either an error response is provided to the recipient or no data or information is provided to the recipient that made the collection request.

At operation 312, the set of contact information associated with the retrieval key that matched the authentication metadata generated key is provided to the email recipient. The email recipient may utilize the set of contact information to generate and display a contact card for the sender in the message received by the recipient from the sender.

Figure 4:
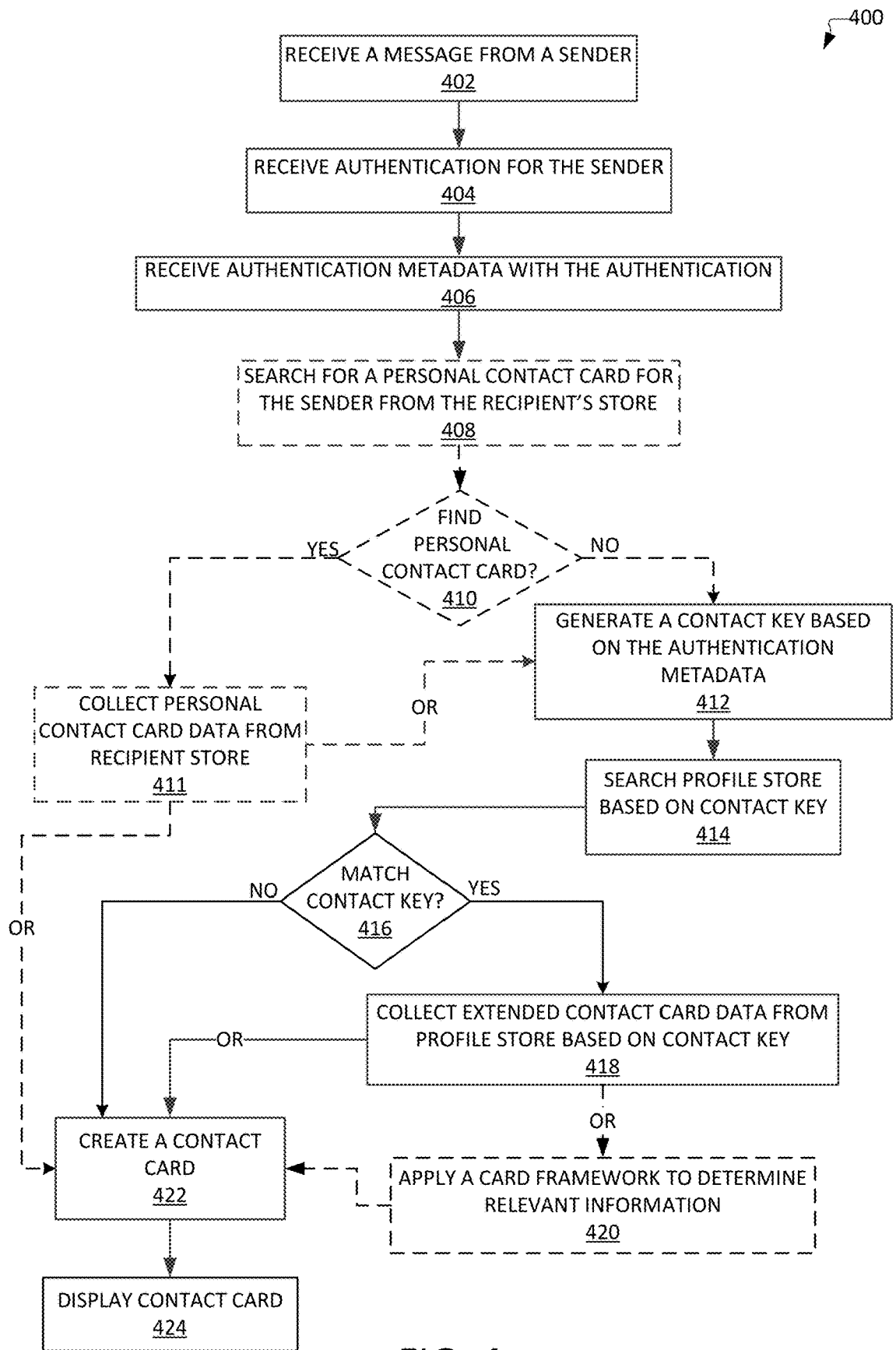
FIG. 4 is block flow diagram illustrating a method for displaying a contact car, in accordance with aspects of the disclosure.

FIG. 4 illustrates a flow diagram conceptually illustrating an example of a method 400 for displaying a contact card. Method 400 provides a secure way for organizations to display customized contact cards in their sent messages. Method 400 leverages currently utilized authentication and BIMI standards. In some aspects, method 400 is performed by the contact customization system 100 described above. In other aspects, method 400 is performed by a message application or any other suitable application.

Method 400 includes operations 402, 404, 406, 422, and 424. In some aspects, method 400 also includes operations 412, 414, 416, and/or 418. In other aspects, method 400 also includes optional operations 408, 410, and 411. In other aspects, method 400 also includes optional operation 420. While operations 408, 410, and 411 are listed in a given order with respect to operations 412 through 420, these operations may be performed in any order as desired. As such, in some aspects, the method 400 performs operation 412 before, simultaneously, or concurrently with operation 408.

At operation 402, a message from a sender is received. For example, the massage may be an email message or text message. Next, at operation 404 authentication for the sender of the message is received at operation 404. Authentication metadata is received with the authentication at operation 406. The authentication metadata includes a verified domain. In some aspects, the authentication metadata also includes a selector. In other aspects, at operation 406, a stamped selector is searched for on the received email. If the selector is present, the selector is collected at operation 406.

After operation 406, optional operation 408 and optional operation 412 are performed. At operation 408, basic contact card information is search for from the user's or email recipient's store. At operation 410, a determination is made whether any personal contact card information for the sender is located or not. If a determination is made that the no basic contact card information is found by the search of the personal store, then operation 412 is performed. If a determination is made that basic contact card information for the searcher is found by the search of the personal store, then operation 411 is performed.

At operation 411 basic contact card data from the recipient store is collected. In some aspects, the basic contact data is searched for based on the sender addresses and/or a verified domain name. After the performance of operation 411, either operation 422 or operation 412 is performed depending upon the programmed settings of method 400.

In some aspects, method 400 may have a rule that if basic contact information is found that the extended profile information from a profile store is not searched for and/or utilized. In these aspects, operation 422 is performed after the collection of the basic contact data at operation 411. In other aspects, method 400 may be configured to always search for contact card information from both the user store and the profile store. In these aspects, operation 412 is performed after the collection of the basic contact data at operation 411.

At operation 412 a contact key (also known as an authentication metadata generated key) is created or generated based on the authentication metadata. The contact key includes at least the verified domain name. In some aspects, the contact key is created or generated based also on the sender address and/or a determined selector. In some aspects, the contact key is created utilizing a predetermined set of rules or an encoding algorithm.

Next, at operation 414 a profile store is searched based on the contact key. At operation 414, the profile store is searched to find any retrieval keys that the contact key meets the requirements of or matches. For example, each retrieval key will require a specific list of requirements before the contact card information associated with that retrieval key can be accessed. The contact key matches or meets the requirements of the retrieval key when the contact key includes all of the requirements listed in the retrieval key. In some aspects, the contact key matches the retrieval key, even though, the contact key includes additional information to the requirements of the retrieval key. As such, the information in the contact key does not have to be identical to the retrieval key but needs to include all of the listed requirements to match the retrieval key.

The requirements of the retrieval key include at least a verified domain name. In some aspects, the requirements of the retrieval key may also include a sender address and/or a selector. As discussed above, the requirements of the retrieval key will be set by the sender. For example, the sender may set a list of sender addresses that may access a given set of stored contact card information.

As discussed above, the contact key will include at least the verified domain name. In some aspects, the contact key will include any requirements that can be gathered from the received message, such as a verified domain name, a sender address and/or a selector. The selector is gathered and included in the contact key when present. In some aspects, the selector is found when a sender stamps a sent message with a selector. In other aspects, the selector is found in the authentication metadata.

At operation 416, a determination is made whether the contact key matched or met the requirements of a retrieval key in the profile store. If the contact key matched a retrieval key in the profile store at operation 416, then operation 418 is performed. If the contact key did not match any retrieval key in the profile store, then no contact card information is retrieved from the profile store and operation 422 is performed.

For example, a contact key may include a verified domain name Zing and a sender address "noreply@zing.com." The profile store is searched based on this contact key and matched to a retrieval key with a requirement of a verified domain name of Zing. In another example, a contact key may include a verified domain name Zing, a selector of "spring" and a sender address "noreply@zing.com." The profile store is searched based on this contact key and matched to a retrieval key with a requirement of a verified domain name of Zing and selector of "spring."

At operation 418, in response to the contact card key matching a retrieval key in the profile store, the extended contact card data associated with the matching retrieval key from the profile store is located and collected based on the contact key. The term collected at utilized herein refers to the active retrieval and/or the passive receipt of information. The extended contact card data (also referred to as a set of contact card information) may include any data or information the organization desires to be display in the sender contact card in the recipient's email. For example, the extended contact card data may include sender name, address, website, promotion information, telephone number, fax number, other contact information, and/or extensibility points. This list is exemplary only and is not meant to be limiting.

In some aspects, optional operation 420 is performed after operation 418. In these aspects, a card framework is applied to all of the retrieved data from the user store and/or profile store to determine the relevant data. The non-relevant data is filtered out and not utilized during operation 422. In these aspects, operation 422 creates a contact card utilizing only the relevant data determined at operation 420. In some aspects, the card framework is a set of predetermine rules. The set of predetermined rules may be set by the creator of the messaging application and/or the by the user of the messaging application. In other aspects, the card framework is a relevancy threshold. The relevancy threshold may be set by the creator of the messaging application and/or the by the user of the messaging application.

At operation 422 the contact card is created based on the gathered data. As discussed above the collected data may vary based on what was collected for the sender from the user's store and/or the profile store and may vary based on how method 400 is configured. As such, the collected information may include no information other than sender address, filtered relevant data, the information collected from the recipient's store, the information collected from the profile store, or the information collected from both the recipient's store and the profile store. The contact card is created at operation 422 based on the collected information utilizing any known or suitable systems, applications and/or methods for creating sender contacts.

After operation 422, operation 424 is performed. At operation 242 the contact card created at operation 422 is displayed. In some aspects, the contact card is display automatically upon creation at operation 424. In other aspects, the contact card is display upon the occurrence of a condition, such as hovering over or selection of the sender's name on the received message, at operation 424.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
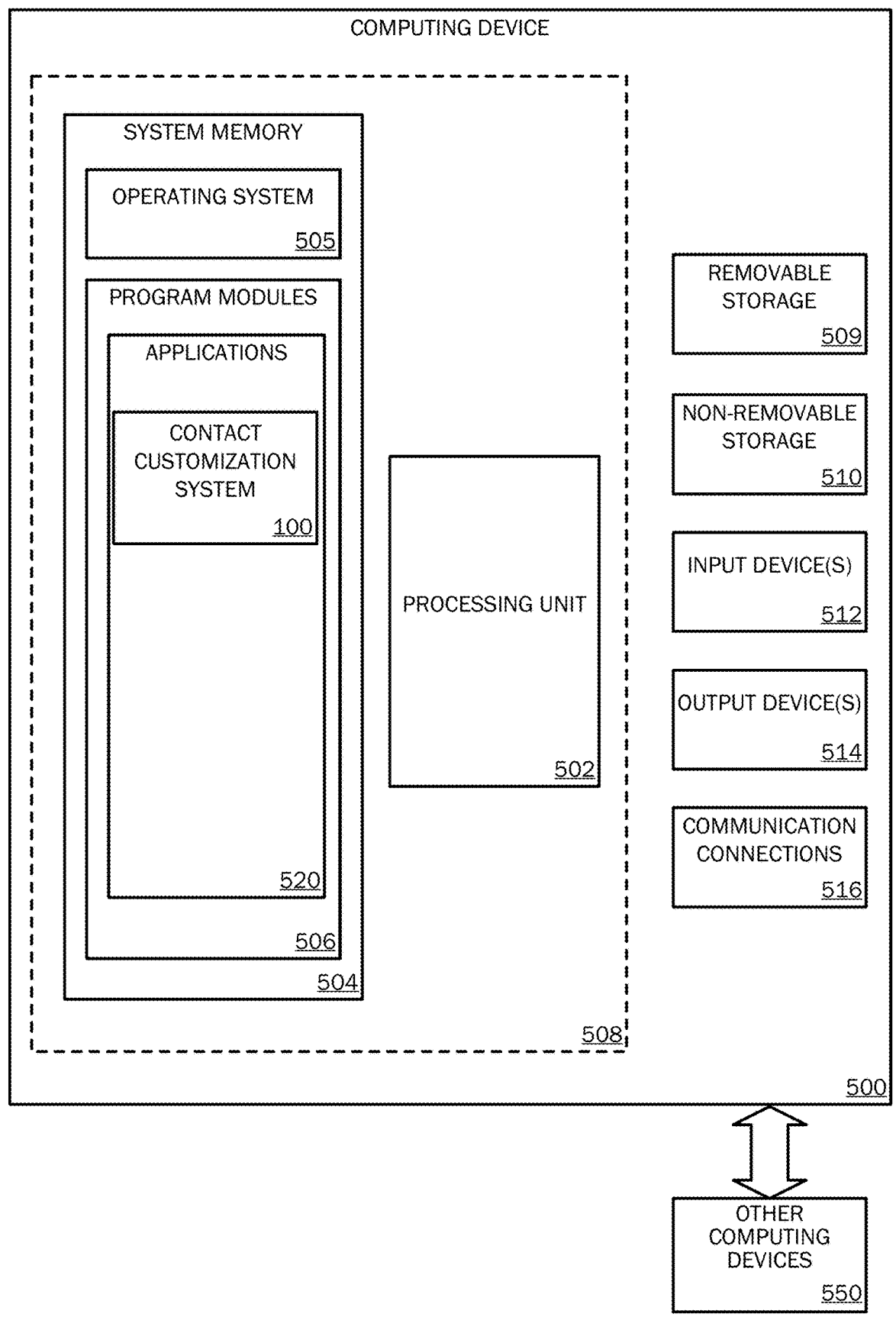
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the contact customization system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the contact customization system 100 that can be executed to employ methods 300 and/or 400 as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., contact customization system 100) may perform processes including, but not limited to, performing method 400 as described herein. For example, the processing unit 502 may implement the contact customization system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
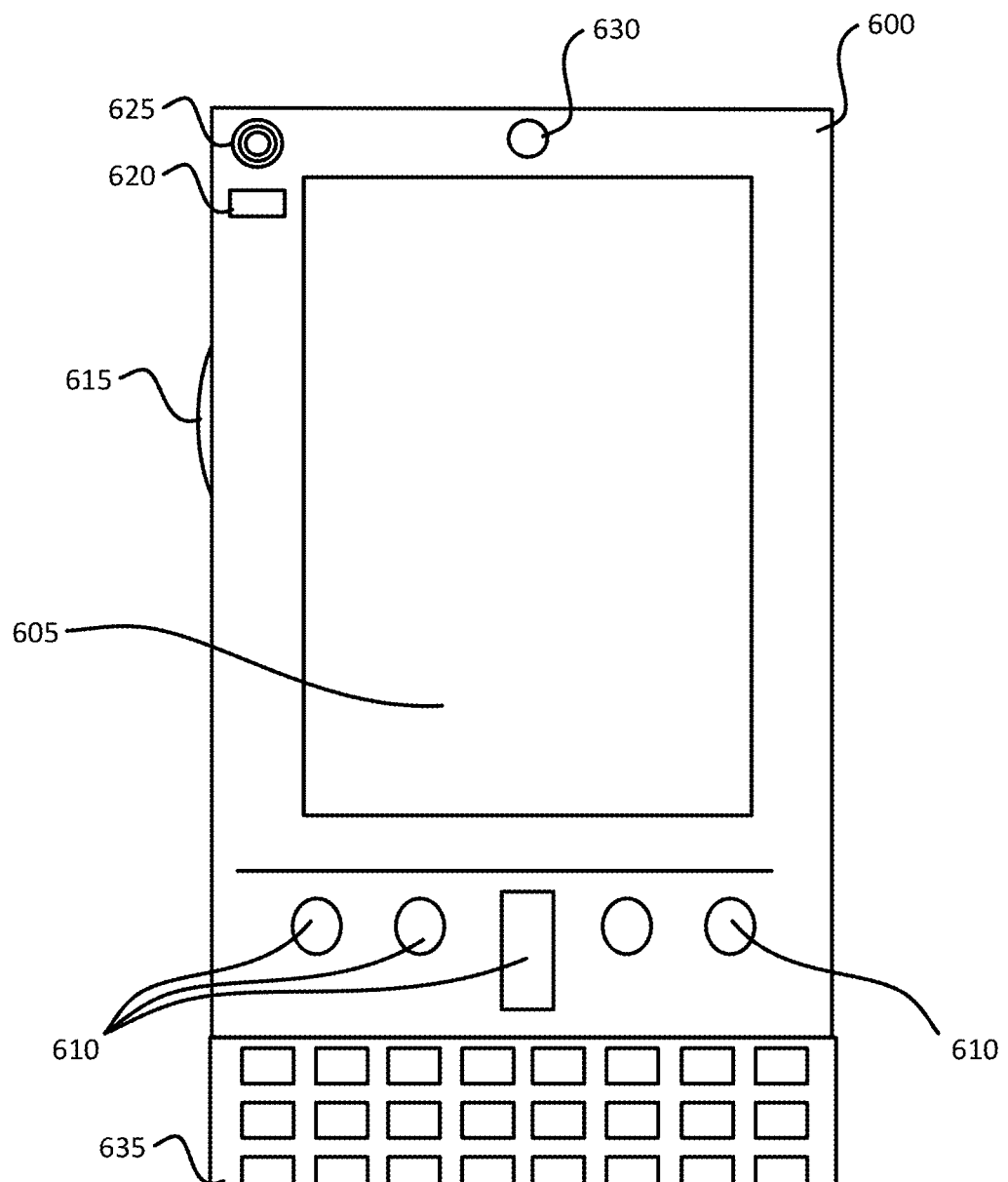
FIG. 6A is a simplified block diagram of a mobile computing device with which various aspects of the disclosure may be practiced.
Figure 6B:
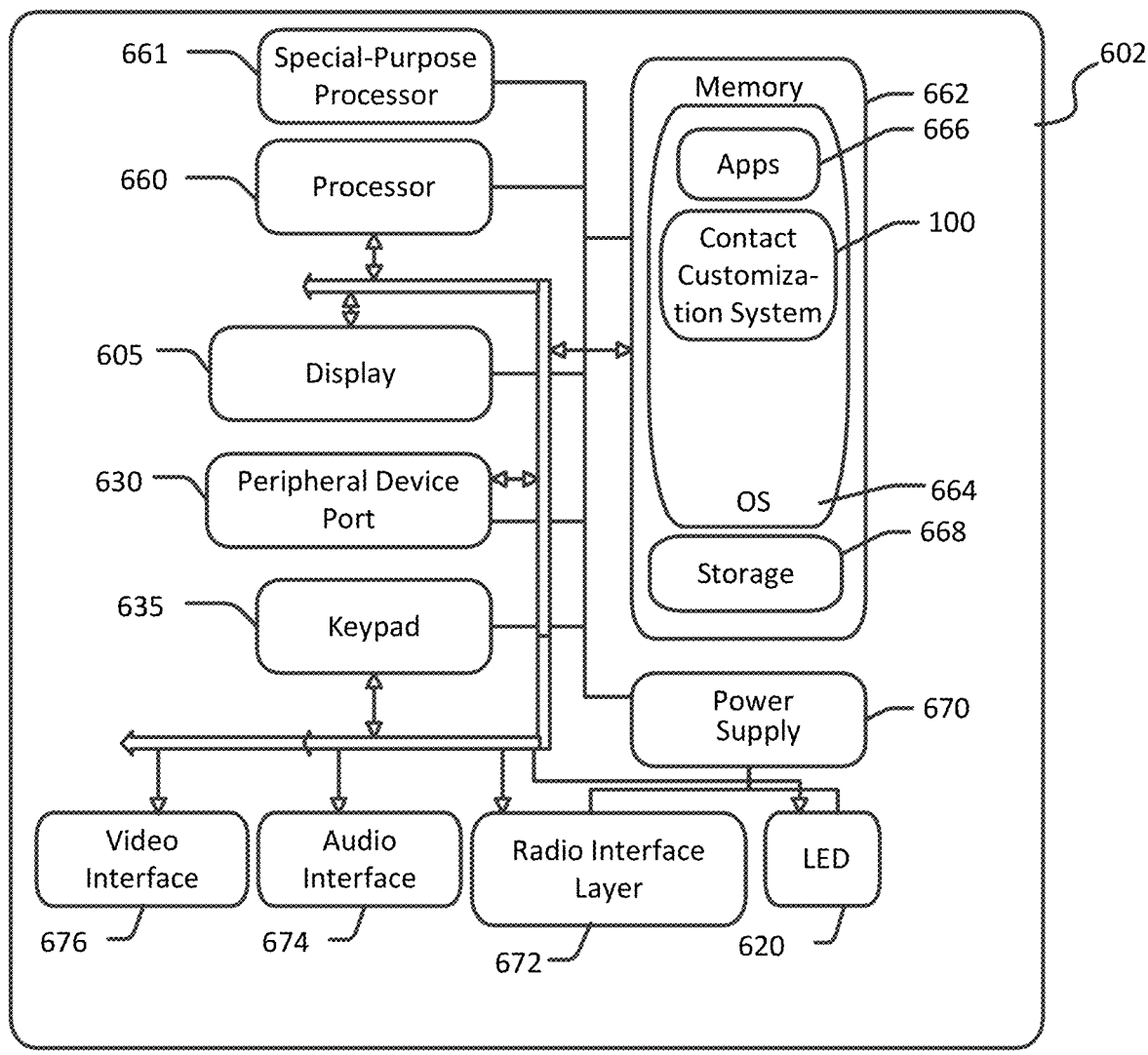
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the contact customization system 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
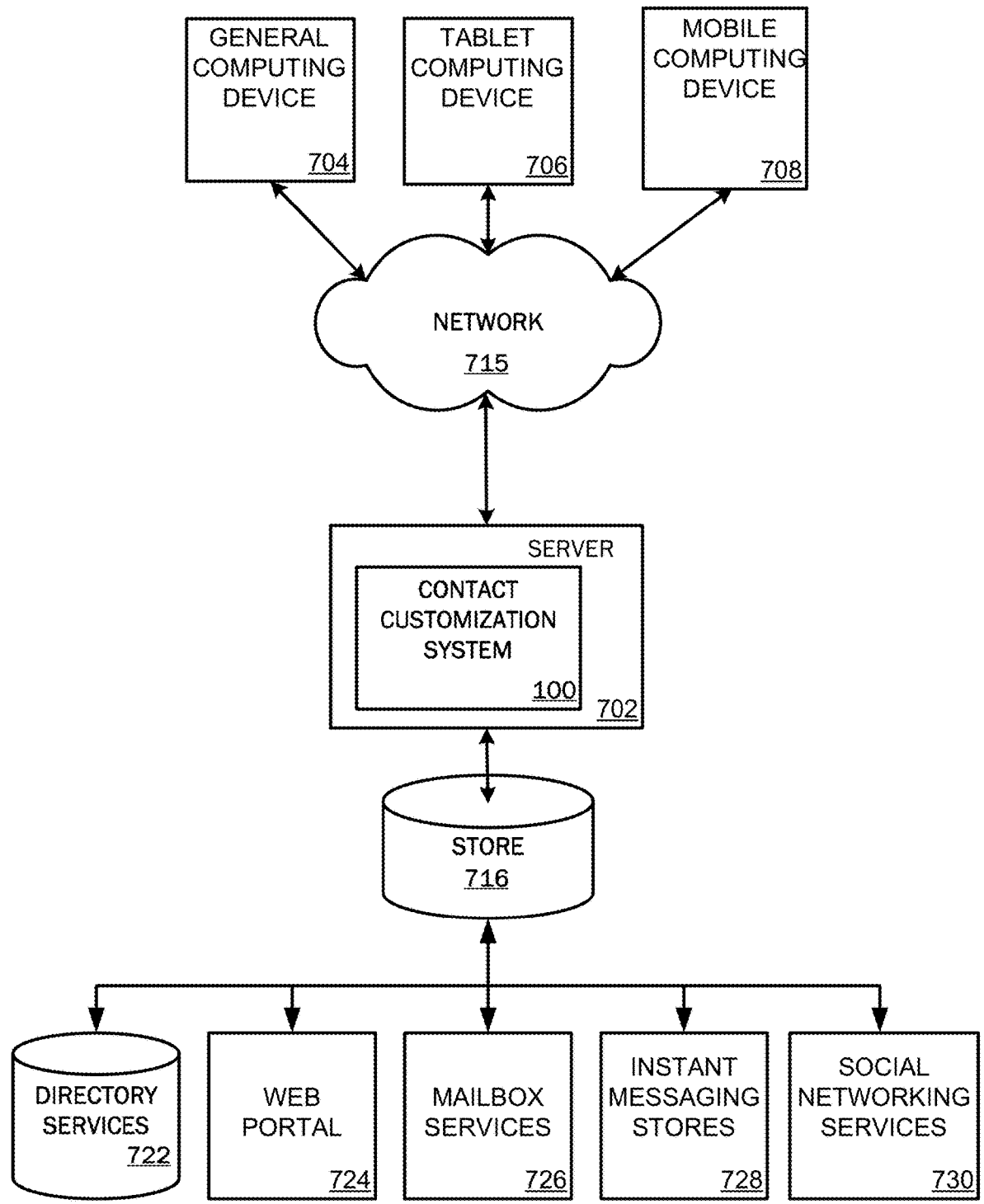
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the contact customization system 100 may be implemented in a general computing device 704, a tablet computing device 706 and/or a mobile computing device 708 (e.g., a smart phone). In some aspects, the server 702 is configured to implement a contact customization system 100, via the network 715 as illustrated in FIG. 7.

Figure 8:
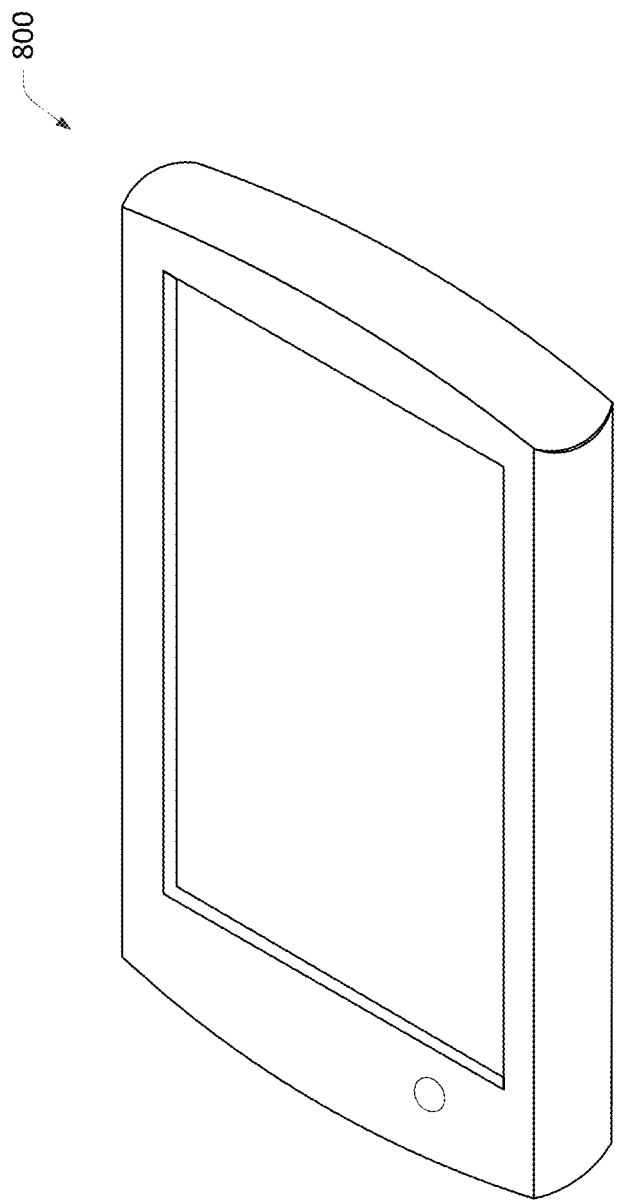
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The invention claimed is:

1. A computer-implemented method, comprising:
retrieving authentication metadata from an electronic message, wherein the authentication metadata includes a verified domain;
generating a contact key based on a first selector in the authentication metadata, wherein the authentication metadata further includes a location conforming to a branded indicators for message identification protocol;
electronically requesting authentication of a sender of the electronic message via a profile store based on the contact key;
in response to the sender of the electronic message being authenticated by the profile store, receiving extended contact card data from the profile store based on a second selector in the contact key by locating a profile within the profile store based on matching the contact key to a retrieval key indexed to the profile, the second selector conforming to the branded indicators for message identification protocol, wherein the extended contact card data corresponds to a particular set of customized contact information among a plurality of sets of customized contact information of the sender of the electronic message, the particular set of customized contact information of the sender being associated with the second selector in the contact key;
collecting the extended contact card data from the profile based on the contact key;
generating a contact card based on the extended contact card data; and
causing display of the contact card at a recipient device.

2. The method of claim 1, further comprising:
searching for basic contact card data for the sender in a recipient's store;
collecting the basic contact card data for the sender; and
generating the contact card further based on the basic contact card data.

3. The method of claim 2, further comprising:
applying a card framework to the extended contact card data to generate filtered content; and
generating the contact card based on the filtered content.

4. The method of claim 3, wherein the card framework is a set of rules.

5. The method of claim 1, further comprising:
searching for basic contact card data for the sender; and
determining that the basic contact card data for the sender is not available,
wherein generating the contact key based on the authentication metadata is performed in response to determining that the basic contact card data for the sender is not available.

6. The method of claim 1, further comprising:
receiving a cursor hover input over the sender of the electronic message,
wherein displaying the contact card is performed in response to receiving the cursor hover input over the sender of the electronic message.

7. The method of claim 1, wherein generating the contact card based on the extended contact card data comprises:
including at least one of the following in the contact card: a name, an address, a website, one or more promotions, a telephone number, or extensibility points.

8. The method of claim 1, wherein the authentication metadata includes a verified domain name, the method further comprising:
determining that the electronic message is stamped with a selector; and
generating the contact key based on the verified domain name, a sender address, and the selector.

9. One or more computer storage devices having computer-executable instructions embodied thereon that, when executed by one or more processors, cause the one or more processors to:
create a plurality of retrieval keys for an organization, the plurality of retrieval keys including respective domains and selectors;
authenticate a sender of an electronic message based on a contact key that is generated based on authentication metadata for the electronic message, wherein the authentication metadata includes a location conforming to a branded indicators for message identification protocol;
in response to the contact key meeting at least two requirements set in a retrieval key among the plurality of retrieval keys, provide, to a message recipient of the electronic message, a customized set of contact information of the organization based on a selector in the contact key, wherein the at least two requirements include a verified domain name associated with the sender, the verified domain name indicating the sender being authorized to use the verified domain name;
select, based on one or more rules set by a creator of a messaging application, relevant content from the customized set of contact information of the organization;
generate a contact card at a recipient device based on the relevant content; and
in response to the contact key being failed to match with the plurality of retrieval keys, provide an error code to the message recipient.

10. The one or more computer storage devices of claim 9, wherein the instructions, when executed by the one or more processors, further cause the one or more processors to:
enable an application user to select the one or more rules.

11. The one or more computer storage devices of claim 9, wherein the one or more rules include a relevancy threshold.

12. A profile store system, comprising:
at least one processor; and
a memory for storing and encoding computer executable instructions that, when executed by the at least one processor, cause the at least one processor to:
receive sets of contact card information from different organizations associated with different domain names;
form a group of retrieval keys for an organization based on respective sets of customized contact card information associated with the organization;
receive from a first email recipient a first collection request including a first authentication key, wherein the first authentication key includes a verified domain name, at least one sender address, and a selector;
match the first authentication key to a first retrieval key in the group of retrieval keys based on the verified domain name and the selector in the first authentication key, the verified domain name indicating a sender being authorized to use the verified domain name, the selector conforming to a branded indicators for message identification protocol; and
provide to the first email recipient a first set of contact card information associated with the first retrieval key that matches the first authentication key, wherein the first set of contact card information is selected, based on the selector in the first authentication key that conforms to the branded indicators for message identification protocol, from a plurality of customized contact card information of the organization.

13. The system of claim 12, wherein different sets of contact card information can be received for the organization.

14. The system of claim 12, wherein the instructions, when executed by the at least one processor, further cause the at least one processor to create the first retrieval key based on the selector and the at least one sender address associated with the first set of contact card information.

15. The system of claim 12, wherein the instructions, when executed by the at least one processor, further cause the at least one processor to:
receive from a second email recipient a second collection request, wherein the second collection request includes a second authentication key;
match the second authentication key to the first retrieval key in the group of retrieval keys; and
provide to the second email recipient the first set of contact card information associated with the first retrieval key that matches the second authentication key.

16. The system of claim 12, wherein the instructions, when executed by the at least one processor, further cause the at least one processor to:

receive from a second email recipient a second collection request, wherein the second collection request includes a second authentication key;
match the second authentication key to a second retrieval key in the group of retrieval keys; and
provide to the second email recipient a second set of contact card information associated with the second retrieval key that matches the second authentication key.

\* \* \* \* \*